(12) United States Patent
Toriyama

(10) Patent No.: US 7,116,442 B2
(45) Date of Patent: Oct. 3, 2006

(54) IMAGE PROCESSING APPARATUS APPLICABLE TO DIFFERENT COPYING TYPES OF COLOR COPYING MACHINES

(75) Inventor: Hideyuki Toriyama, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 957 days.

(21) Appl. No.: 09/813,973

(22) Filed: Mar. 22, 2001

(65) Prior Publication Data

US 2001/0024290 A1 Sep. 27, 2001

(30) Foreign Application Priority Data

Mar. 27, 2000 (JP) .............................. 2000-086359

(51) Int. Cl.
*G06F 15/00* (2006.01)
*G03F 3/08* (2006.01)

(52) U.S. Cl. ...................... 358/1.9; 358/518; 358/1.16

(58) Field of Classification Search .................. 358/1.9, 358/527, 1.13, 1.18, 1.4, 2.1, 1.16, 1.15, 358/540, 538, 453, 450, 534, 532; 382/162, 382/167

See application file for complete search history.

(56) References Cited

U.S. PATENT DOCUMENTS

| | | | | |
|---|---|---|---|---|
| 5,016,096 A | * | 5/1991 | Matsunawa et al. ......... | 358/538 |
| 5,032,928 A | * | 7/1991 | Sakai et al. .................. | 358/448 |
| 5,083,218 A | * | 1/1992 | Takasu et al. ............... | 358/473 |
| 5,086,346 A | * | 2/1992 | Fujisawa ...................... | 358/453 |
| 5,115,320 A | * | 5/1992 | Ebihara et al. .............. | 358/296 |
| 5,119,437 A | * | 6/1992 | Kuwamura et al. ......... | 382/175 |
| 5,124,799 A | * | 6/1992 | Tsuboi et al. ................ | 358/296 |
| 5,159,187 A | * | 10/1992 | Okisu et al. ............. | 250/208.1 |
| 5,189,523 A | * | 2/1993 | Sugiura et al. ............. | 358/300 |
| 5,206,719 A | * | 4/1993 | Ikeda et al. .................. | 358/518 |
| 5,293,255 A | * | 3/1994 | Nishizawa et al. ......... | 358/453 |
| 5,296,945 A | * | 3/1994 | Nishikawa et al. ......... | 358/518 |
| 5,311,336 A | * | 5/1994 | Kurita et al. ............... | 358/538 |
| 5,337,164 A | * | 8/1994 | Yabe et al. .................. | 358/487 |
| 5,339,172 A | * | 8/1994 | Robinson .................... | 358/462 |
| 5,465,307 A | * | 11/1995 | Azumaya et al. ........... | 382/165 |
| 5,523,849 A | * | 6/1996 | Jamzadeh .................... | 358/1.9 |
| 5,548,663 A | * | 8/1996 | Sekine et al. ............... | 382/164 |
| 5,570,432 A | * | 10/1996 | Kojima ........................ | 382/254 |
| 5,606,431 A | * | 2/1997 | Park ............................ | 358/503 |
| 5,654,807 A | * | 8/1997 | Miyaza ....................... | 358/450 |

(Continued)

FOREIGN PATENT DOCUMENTS

JP         8-251402        9/1996

(Continued)

OTHER PUBLICATIONS

Japanese Office Action mailed Oct. 18, 2005, directed to JP Application No. 2000-086359.

*Primary Examiner*—Madeleine A V Nguyen
(74) *Attorney, Agent, or Firm*—Morrison & Foerster LLP

(57) ABSTRACT

To reduce the number of memories, an image processing apparatus includes a color correcting unit for sequentially processing input pixel data, a memory device provided at a preceding stage of the color correcting unit and for storing the pixel data, a region discriminating unit for discriminating a characteristic of an image region including a plurality of pixel data, and an MTF correcting unit 23 for processing, based on the determined characteristic, the pixel data processed at the color correcting unit. The number of memories can be reduced by providing the memory device at a preceding stage of the color correcting unit, compared to when it is provided at a subsequent stage.

26 Claims, 7 Drawing Sheets

U.S. PATENT DOCUMENTS

| | | | | |
|---|---|---|---|---|
| 5,663,809 A | * | 9/1997 | Miyaza et al. | 358/450 |
| 5,677,771 A | * | 10/1997 | Ohta | 358/296 |
| 5,767,978 A | * | 6/1998 | Revankar et al. | 358/296 |
| 5,850,298 A | * | 12/1998 | Narahara et al. | 358/518 |
| 5,892,592 A | * | 4/1999 | Adachi et al. | 358/462 |
| 5,940,192 A | * | 8/1999 | Ichikawa et al. | 358/530 |
| 5,973,804 A | * | 10/1999 | Yamada | 358/538 |
| 5,995,248 A | * | 11/1999 | Katori et al. | 358/2.1 |
| 5,999,279 A | * | 12/1999 | Kouzaki et al. | 358/520 |
| 5,999,646 A | * | 12/1999 | Tamagaki | 382/169 |
| 6,084,984 A | * | 7/2000 | Ishikawa | 382/173 |
| 6,088,137 A | * | 7/2000 | Tomizawa | 358/538 |
| 6,088,138 A | * | 7/2000 | Sakai et al. | 358/540 |
| 6,473,198 B1 | * | 10/2002 | Matama | 358/1.9 |
| 6,535,302 B1 | * | 3/2003 | Ikeda et al. | 358/3.26 |
| 6,538,769 B1 | * | 3/2003 | Takemoto et al. | 358/1.9 |
| 6,559,976 B1 | * | 5/2003 | Hirota | 358/3.03 |
| 6,600,832 B1 | * | 7/2003 | Nakayama et al. | 382/162 |
| 6,704,467 B1 | * | 3/2004 | Uchida | 382/311 |
| 6,717,617 B1 | * | 4/2004 | Ozono | 348/324 |
| 6,721,066 B1 | * | 4/2004 | Hirota et al. | 358/1.9 |
| 6,757,444 B1 | * | 6/2004 | Matsugu et al. | 382/283 |
| 2001/0048530 A1 | * | 12/2001 | Hayashi et al. | 358/1.13 |

FOREIGN PATENT DOCUMENTS

| | | | |
|---|---|---|---|
| JP | 10-336470 | | 12/1998 |
| JP | 411031708 A | * | 2/1999 |
| JP | 11-165450 | | 6/1999 |

* cited by examiner

F I G. 7

| | TANDEM | 4-CYCLE |
|---|---|---|
| S1 | A | B |
| S2 | A | B |
| S3 | A | B |
| S4 | A | B |
| S5 | A | B |
| MEMORY A | ○ | ○ |
| MEMORY B | ○ | × |
| MEMORY C | ○ | × |

IMAGE PROCESSING APPARATUS APPLICABLE TO DIFFERENT COPYING TYPES OF COLOR COPYING MACHINES

This application is based on Application No. 2000-86359 filed in Japan, the content of which is hereby incorporated by reference.

BACKGROUND OF THE INVENTION

1. Field of the Invention

The present invention relates to an image processing apparatus and an image processing circuit, and more particularly, to an image processing apparatus and an image processing circuit applicable to different copying types of color copying machines.

2. Description of the Background Art

Conventionally, two types of color copying machines are known. The first type is a color copying machine of a four-cycle type including one photoreceptor drum and four developing units forming a toner image on the photoreceptor drum. The four developing units are respectively provided for four color toners of cyan (C), magenta (M), yellow (Y) and black (K). In the full color copying machine of the four-cycle type, the steps of forming an electrostatic latent image on the photoreceptor drum by the developing units and transferring the electrostatic latent image formed on the photoreceptor drum onto a sheet of paper are repeated four times in the order of cyan, magenta, yellow and black.

The second type is a color copying machine of a tandem type, in which photoreceptor drums are respectively provided corresponding to four developing units for cyan (C), magenta (M), yellow (Y) and black (K). In the tandem type color copying machine, electrostatic latent images are formed on the four photoreceptor drums almost at the same time, and the latent images formed on the respective photoreceptor drums are transferred when a sheet of paper makes contact with the four photoreceptor drums by turns.

Therefore, the tandem type copying machine has an advantage that an image forming speed is faster compared to the four-cycle type copying machine. However, the tandem type copying machine has a disadvantage such that the four receptor drums provided therein makes the machine more expensive compared to the four-cycle type color copying machine using one receptor drum. A user may desire a machine at a lower price even with low speed or a machine with high speed even at a higher price. Therefore, makers are required to provide various types of color copying machines in order to respond to the needs.

The color copying machines of the two types described above both include four developing units. Thus, the two types use the same data for forming electrostatic latent images in the respective developing units, i.e. the data for generating a laser emitting onto a receptor drum. Therefore, if a circuit from reading the original to outputting the data for the laser beam emission is designed separately for each type of the color copying machines, the enormous number of designing man-hours would be required, decreasing productivity.

Further, a unit price can generally be reduced as the number of items produced in quantity is increased, so that a common circuit may be used in terms of productivity and price.

However, the tandem type color copying machine generates the data for forming four electrostatic latent images of cyan, magenta, yellow and black to almost simultaneously write the data onto the respective photoreceptor drums, whereas the four-cycle type color copying machine generates the four data for cyan, magenta, yellow and black by turns to write the data in sequence. Thus, each type has different timing of data generation.

Generally, image data processing and a process of obtaining a characteristic such as a character or a photograph required for the data processing at a subsequent stage are performed in parallel. However, there is a problem that the process of obtaining a characteristic needs longer processing time compared to the image data processing performed in parallel therewith, since the process of obtaining the characteristic is performed based on a plurality of pixel data. The image data to be input into the subsequent stage must be delayed by the processing time period for obtaining a characteristic amount, in order to synchronously input the image data processed in the preceding stage and the characteristic amount processed in parallel therewith into the data processing in the subsequent stage. The number of memories in a circuit in which the data delay is required is defined by the number of data generated. Thus, the tandem type almost simultaneously generating four data would require four memories for four data in order to delay the four data, whereas the four-cycle type sequentially generating data would require only one memory for one data. However, a circuit used in common for the tandem type and the four-cycle type would have to include the number of memories needed for the type requiring a larger number of memories, resulting in a problem that unnecessary memories would be mounted for the type requiring a smaller number of memories, which increases the cost by that much.

SUMMARY OF THE INVENTION

The present invention is directed to solve the problems described above, and one object of the present invention is to provide an image processing apparatus in which a memory cost is reduced.

Another object of the present invention is to provide an image processing apparatus that can be used for different purposes and also can change the number of memories used therein to accommodate to the purposes.

To achieve the objects described above, according to an aspect of the present invention, an image processing apparatus includes a first processing unit for sequentially processing input pixel data; a memory device provided at a preceding stage of the first processing unit to store the pixel data; a second processing unit for determining a characteristic of an image region including a plurality of pixel data; and a third processing unit for processing the pixel data processed at the first processing unit, based on the characteristic determined by the second processing unit.

According to another aspect of the present invention, an image processing apparatus includes a first processing unit for sequentially processing pixel data in response to input of the pixel data; a second processing unit for determining a characteristic of an image region including a plurality of pixel data; a third processing unit for processing pixel data processed at the first processing unit, based on the characteristic determined by the second processing unit; a connecting unit for connecting a memory device; and a switch device for switching a circuit such that the connecting unit is arranged either at a preceding stage of the first processing unit or between the first processing unit and the third processing unit.

According to a further aspect of the present invention, an image processing apparatus includes a first processing unit for converting, in response to input of pixel data including a set of a plurality of color data, the plurality of color data into a plurality of image color data in a first state, and the plurality of color data into one image color data of the plurality of image color data in a second state; a second processing unit for determining a characteristic of an image region including a plurality of pixel data; a third processing unit for processing, based on a characteristic amount determined by the second processing unit, the plurality of image color data converted at the first processing unit in the first state, and the one image color data converted at the first processing unit in the second state; a connecting unit for connecting a memory device; and a switch device for arranging a plurality of connecting units, corresponding to the plurality of color data, at a preceding stage of the first processing unit in the first state, and for arranging the connecting unit, corresponding to the one image color data, between the first processing unit and the second processing unit in the second state.

According to a still further aspect of the present invention, an image processing apparatus includes a memory device to store input image data; a first processing unit to sequentially convert and output the image data stored in the memory device; a second processing unit to receive the same image data as image data input into the memory device and to output data processed based on the received image data; and a third processing unit to receive the image data output from the first processing unit and the data output from the second processing unit, and to process the image data output from the first processing unit based on the data output from the second processing unit.

According to a further aspect of the present invention, an image processing apparatus includes a memory device to store image data; a first processing unit to sequentially convert and output input image data; a second processing unit to receive a plurality of image data, and to output data processed based on the input image data; a third processing unit to process image data output from the memory device and image data processed at the first processing unit, based on the data output from the second processing unit; a first circuit to input the image data output from the memory device into the first processing unit; a second circuit to input the image data output from the first processing unit into the memory device and also to input the image data output from the memory device into the second processing unit; and a switch device to selectively switch the first circuit and the second circuit.

According to a further aspect of the present invention, an image processing apparatus includes a memory device to store image data; a first processing unit to convert, in response to input of image data including a set of a plurality of color data, the plurality of color data into a plurality of image color data in a first state, and the plurality of color data into one image color data of the plurality of image color data in a second state; a second processing unit to receive a plurality of image data, and to output data processed based on the input image data; a third processing unit to process, based on data output from the second processing unit, a plurality of image color data converted at the first processing unit in the first state, and the one image color data converted at the first processing unit in the second state; a first circuit to input image data including a set of a plurality of color data output from the memory device into the first processing unit; a second circuit to input one image color data output from the first processing unit into the memory device, and also inputting one image color data output from the memory device into the second processing unit; and a switch device to selectively switch the first circuit and the second circuit to select the first circuit in the first state and to select the second circuit in the second state.

According to a further aspect of the present invention, an image forming apparatus includes a memory device to store input image data; a first processing unit to sequentially convert and output the image data stored in the memory device; a second processing unit to receive same image data as the image data input to the memory device, and to output data processed based on the input image data; a third processing unit to receive the image data output from the first processing unit and the data output from the second processing unit, and to process the image data output from the first processing unit based on the data output from the second processing unit; and an image forming unit to form an image on a sheet based on image data output from the third processing unit.

According to a further aspect of the present invention, an image forming apparatus includes a memory device to store image data; a first processing unit to sequentially convert and output input image data; a second processing unit to receive a plurality of image data, and to output data processed based on the input image data; a third processing unit to process image data output from the memory device and image data processed at the first processing unit, based on the data output from the second processing unit; a first circuit to input image data output from the memory device into the first processing unit; a second circuit to input the image data output from the first processing unit and also to input the image data output from the memory device into the second processing unit; a switch device to selectively switch the first circuit and the second circuit; and an image forming unit to form an image on a sheet based on the image data output from the third processing unit.

According to the present invention, an image processing apparatus in which the memory cost is reduced can be provided.

Moreover, an image processing apparatus that can be used for different purposes and can change the number of memories used to accommodate to the purposes.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 shows differences in switches and memories between cases where the image processing apparatus according to the embodiment is applied to the tandem type color copying machine and where it is applied to the four-cycle type color copying machine.

DESCRIPTION OF THE PREFERRED EMBODIMENT

Figure 1:
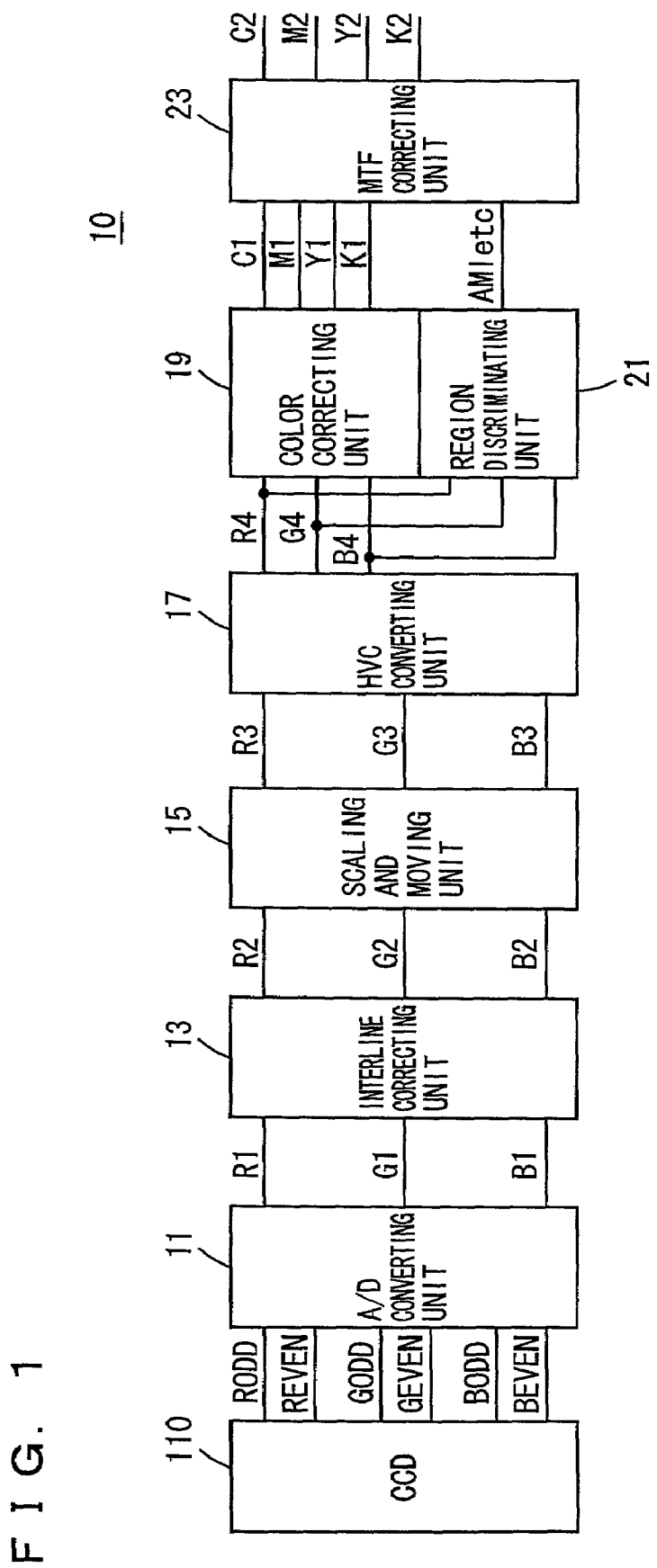
FIG. 1 is a block diagram showing a schematic configuration of an image processing apparatus according to one embodiment of the present invention.

An embodiment of the present invention will be descried below with reference to the drawings. It is noted that the same reference characters denote the same or the corresponding members, and the descriptions thereof will not be repeated.

Referring to FIG. 1, an image processing apparatus 10 includes a charge coupled device (CCD) 110 for reading an original in color, an analog/digital converting unit (hereinafter referred to as "A/D converting unit") 11 for converting analog signals of red (R), green (G) and blue (B) into digital signals, an interline correcting unit 13, a scaling and moving unit 15 for changing a scale of an image and moving a position thereof, an HVC (Hue Value Chroma) converting unit 17 for converting a hue, a region discriminating unit 21 for detecting a dot or an edge from a region in image data to discriminate an attribute of the region, a color correcting unit 19 for converting and correcting color data of RGB to image color data of CMYK represented by a CMY color space, and an MTF (Modulation Transfer Function) correcting unit 23 for providing the image color data of CMYK converted and corrected in color correcting unit 19 with edge-emphasizing or smoothing in accordance with the result discriminated by region discriminating unit 21.

CCD 110 reads the original and outputs even-numbered pixel data (REVEN, GEVEN and BEVEN) and odd-numbered pixel data (RODD, GODD and BODD). A/D converting unit 11 merges the even-numbered pixel data and the odd-numbered pixel data that are output from CCD 110 and converts the merged pixel data (in analog signals) into digital signals.

Scaling and moving unit 15 changes the scale of an image and moves the position of the image. HVC converting unit 17 performs image correction on a ground level and image conversion. Color correcting unit 19 performs density conversion, color correction and UCR/BP (under color removal/black paint).

MTF correcting unit 23 performs edge-emphasizing or smoothing of the image.

Data flow will now be described. CCD 110 reads pixel data including color data of RGB, which is converted into digital data at A/D converting unit 11. After the data is subjected to a necessary correction process or the like, the color data of RGB is converted into the image color data of CMYK at color correcting unit 19. As for the pixel data, an attribute of the region to which the pixel data belongs is discriminated at region discriminating unit 21.

The attribute of the region described here means a property of the region to which the pixel data belongs, and different processes are performed for different attributes at MTF correcting unit 23. For example, the region, to which the pixel data belongs, represented by a character has the attribute of "character," the region represented by a photograph has the attribute of "photograph," and the region represented by a dot has the attribute of "dot." The pixel data in the region having the attribute of "character" is subjected to the process of edge-emphasizing in the MTF correcting unit, and the pixel data in the region having the attribute of "photograph" is subjected to the process of smoothing in the MTF correcting unit.

The attribute of the region is discriminated using the pixel data included in a block of M×N including the pixel data to be processed and its peripheral pixel data. Therefore, to discriminate the attribute of the block of M×N at region discriminating unit 21, a plurality of lines of pixel data read by CCD 110 will be required. For example, when a block of 3×3 size is used to discriminate the attribute at region discriminating unit 21, it is necessary to input the lines one before and one after the line of the pixel data to be processed into region discriminating unit 21. Attribute data AMletc discriminated at region discriminating unit 21 is transmitted to MTF correcting unit 23.

MTF correcting unit 23 performs MTF correction for the CMYK image color data C1, M1, Y1 and K1 received from color correcting unit 19 based on the attribute data AMletc received from region discriminating unit 21. In MTF correcting unit 23, the timing at which the image color data of CMYK are received from color correcting unit 19 and the timing at which the attribute data AMletc is received from region discriminating unit 21 are synchronized. For this synchronization, memories are provided before and after color correcting unit 19 to absorb the time period for which the region discriminating process is performed at region discriminating unit 21.

When image processing apparatus 10 according to the present embodiment is applied to the four-cycle type color copying machine, color correcting unit 19 sequentially outputs the image color data in the order of cyan (C), magenta (M), yellow (Y), and black (K) to MTF correcting unit 23. This means that CCD 110 reads the same original four times and outputs the same RGB color data four times.

Whereas, when the image processing apparatus 10 according to the present embodiment is applied to the tandem type color copying machine, CCD 110 reads an original only once and color correcting unit 19 simultaneously transmits the image data of CMYK to MTF correcting unit 23.

Figure 2:
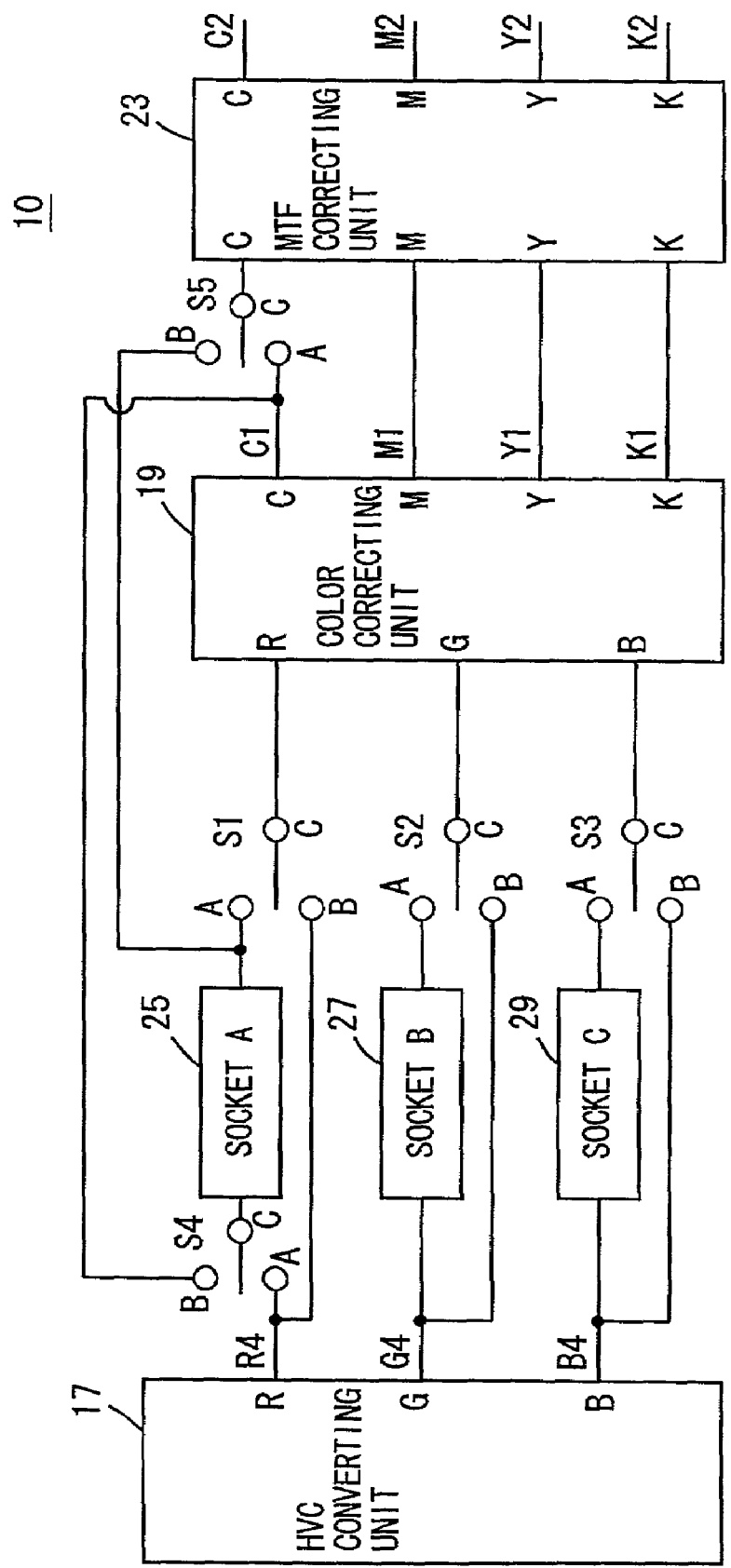
FIG. 2 is a circuit diagram showing a part of a circuit of the image processing apparatus according to the embodiment.

FIG. 2 is a circuit diagram showing a part of a circuit of image processing apparatus 10 according to the present embodiment. FIG. 2 shows a connecting relation between HVC converting unit 17, color correcting unit 19 and MTF correcting unit 23. Referring to FIG. 2, an R output terminal of HVC converting unit 17 is connected to an A terminal of a switch S4 and to a B terminal of a switch S1. Moreover, a G output terminal of HVC converting unit 17 is connected to an input terminal of a socket B 27 and to a B terminal of a switch S2. Further, a B output terminal of HVC converting unit 17 is connected to an input terminal of a socket C 29 and to a B terminal of a switch S3.

A socket A 25 is connected, at the input terminal thereof, to a C terminal of switch S4, and is connected, at the output terminal thereof, to an A terminal of switch S1 and to a B terminal of switch S5. The output terminal of socket B 27 is connected to an A terminal of switch S2. The output terminal of socket C 29 is connected to an A terminal of switch S3.

A C terminal of switch S1 is connected to an R input terminal of color correcting unit 19, a C terminal of switch S2 is connected to a G input terminal of color correcting unit 19, and a C terminal of switch S3 is connected to a B input terminal of color correcting unit 19.

A C output terminal of color correcting unit 19 is connected to a B terminal of switch S4 and to an A terminal of switch S5. An M output terminal, a Y output terminal and a K output terminal of color correcting unit 19 are respectively connected to corresponding input terminals of MTF correcting unit 23.

Switches S1 to S5 can be switched to have connections either between C terminals and A terminals or between C terminals and B terminals.

In image processing apparatus 10 according to the present embodiment, a memory of a necessary capacity can be mounted to each of socket A 25, socket B 27 and socket C 29. Switches S1 to S5 are switched to have connections between C terminals and A terminals, such that sockets A 25, B 27 and C 29 are arranged between HVC converting unit 17 and color correcting unit 19. The C output terminal of color correcting unit 19 is then connected to a C input terminal of MTF correcting unit 23.

Further, switches S1 to S5 are switched to have connections between C terminals and B terminals, such that R output terminal, G output terminal and B output terminal of HVC converting unit 17 are respectively connected directly to R input terminal, G input terminal and B input terminal of color correcting unit 19. Then, C output terminal of color correcting unit 19 is connected to the input terminal of socket A 25, and the output terminal of socket A 25 is connected to C input terminal of MTF correcting unit 23.

As such, the circuit configuration can be changed by switching C terminal of switches S1 to S5 either to connect to A terminal or to B terminal.

Switches S1 to S5 are configured using jumper cables or 0 Ω resistors, or are configured as 2 in 1 selectors by integrating the circuit into an ASIC or the like. When the jumper cables or 0 Ω resistors are used for switches S1 to S5, the jumper cables or 0 Ω resistors are mounted to image processing apparatus 10 by connecting C terminals either to A terminals or to B terminals.

Further, when switches S1 to S5 are configured as the 2 in 1 selectors, terminals connecting to C terminals can be switched to either A terminals or B terminals by a method of setting select terminals in a software manner or a method of logically fixing the switches using pull-up resistors or pull-down resistors.

Figure 3:
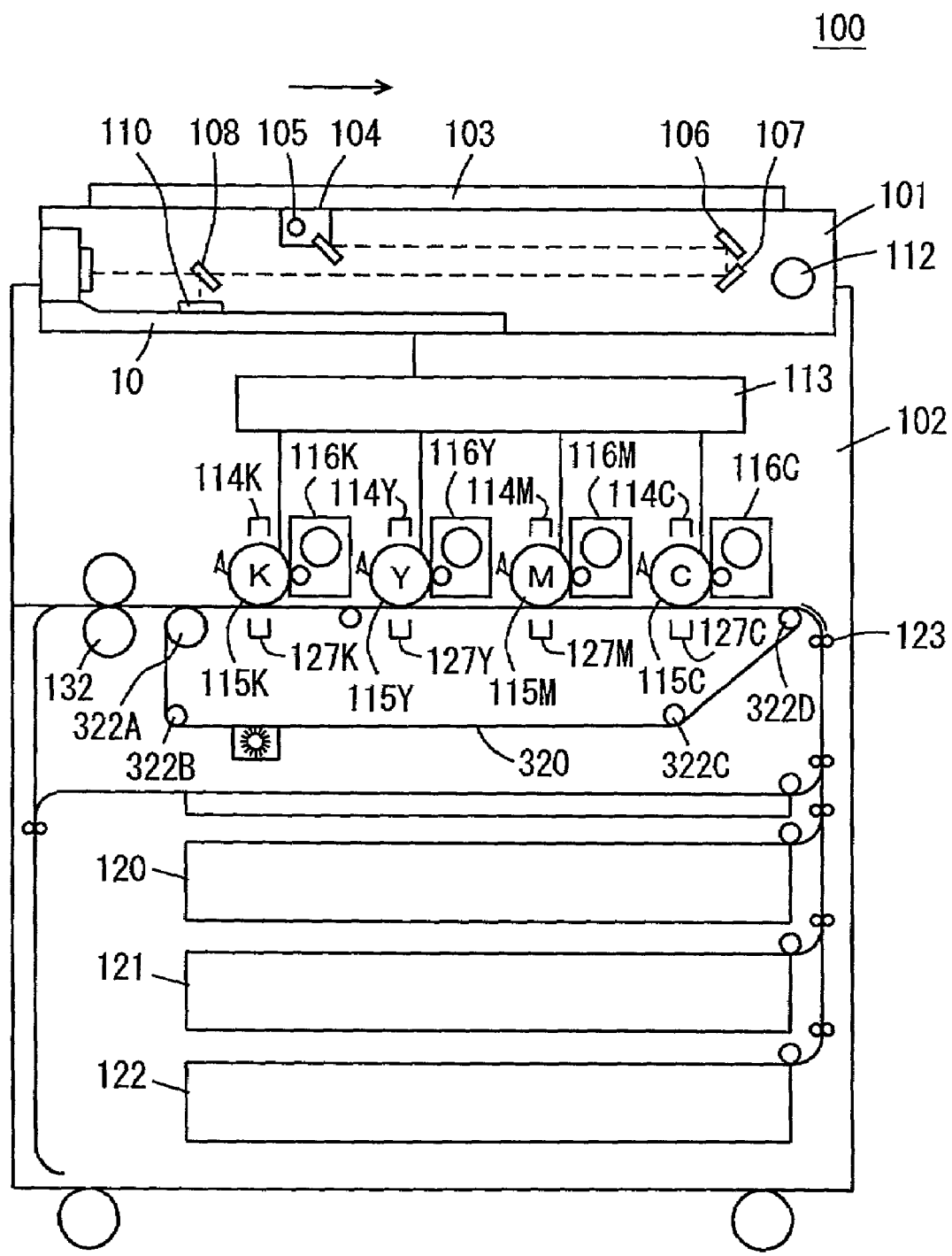
FIG. 3 is a diagrammatic section view showing a schematic configuration of a tandem type color copying machine to which the image processing apparatus according to the embodiment is applied.

FIG. 3 is a diagrammatic section view showing a schematic configuration of the tandem type color copying machine to which image processing apparatus 10 according to the present embodiment is applied. Referring to FIG. 3, a color copying machine 100 is constituted by an image reader unit 101 reading image data from an original, and a printer unit 102 printing an image onto a sheet of paper.

The original placed on an document glass 103 of image reader unit 101 is irradiated with an exposure ramp 105 included in a scanner 104. A reflected light from the surface of the original forms an image on CCD 110 via mirrors 106 to 108 and a condensing lens. CCD 110 converts the reflected light from the original surface into RGB color data (analog signals), and outputs the converted data to image processing apparatus 10. Scanner 104 moves in the direction of the arrow by a scanner motor 112 and scans the entire surface of the original.

Image processing apparatus 10 provides the analog signals input from CCD 110 with a process described above, and outputs digital signals to a laser apparatus 113.

Here, the digital signals output from image processing apparatus 10 to laser apparatus 113 represent image color data for cyan C2, image color data for magenta M2, image color data for yellow Y2 and image color data for black K2. Laser apparatus 113 outputs laser beams to respective photoreceptor drums 115C, 115M, 115Y and 115K for cyan, magenta, yellow and black, based on the input image color data C2, M2, Y2 and K2.

In printer unit 102, the laser beams output from laser apparatus 113 expose photoreceptor drums 115C, 115M, 115Y and 115K charged by electrostatic chargers 114C, 114M, 114Y and 114K, to form electrostatic latent images. Developing units 116C, 116M, 116Y and 116K of four colors of cyan, magenta, yellow and black respectively develop the electrostatic latent images on photoreceptor drums 115C, 115M, 115Y and 115K.

Furthermore, an endless belt 320 is suspended by a driving roller 322A and rollers 322B, 322C and 322D to prevent the belt from loosening. When driving roller 322A rotates anti-clockwise in the drawing, endless belt 320 also rotates anti-clockwise in the drawing at a predetermined speed.

An suitable sheet is transported from one of paper feed cassettes 120 to 122 and is fed from a timing roller 123 to endless belt 320. The sheet fed to endless belt 320 is carried on endless belt 320 and is transported in the left direction of the drawing. This allows the sheet to make contact with photoreceptor drums 115C, 115M, 115Y and 115K in the order of cyan, magenta, yellow and black. When the sheet comes into contact with the respective photoreceptor drums 115C, 115M, 115Y and 115K, transfer chargers 127C, 127M, 127Y and 127K pairing up with the respective photoreceptor drums transfer a toner image developed on the photoreceptor drums onto the sheet.

The sheet on which the toner image is transferred is heated by a fixing roller pair 132. This melts the toner to be fixed onto the sheet. Thereafter, the sheet is discharged from printer unit 102.

Figure 4:
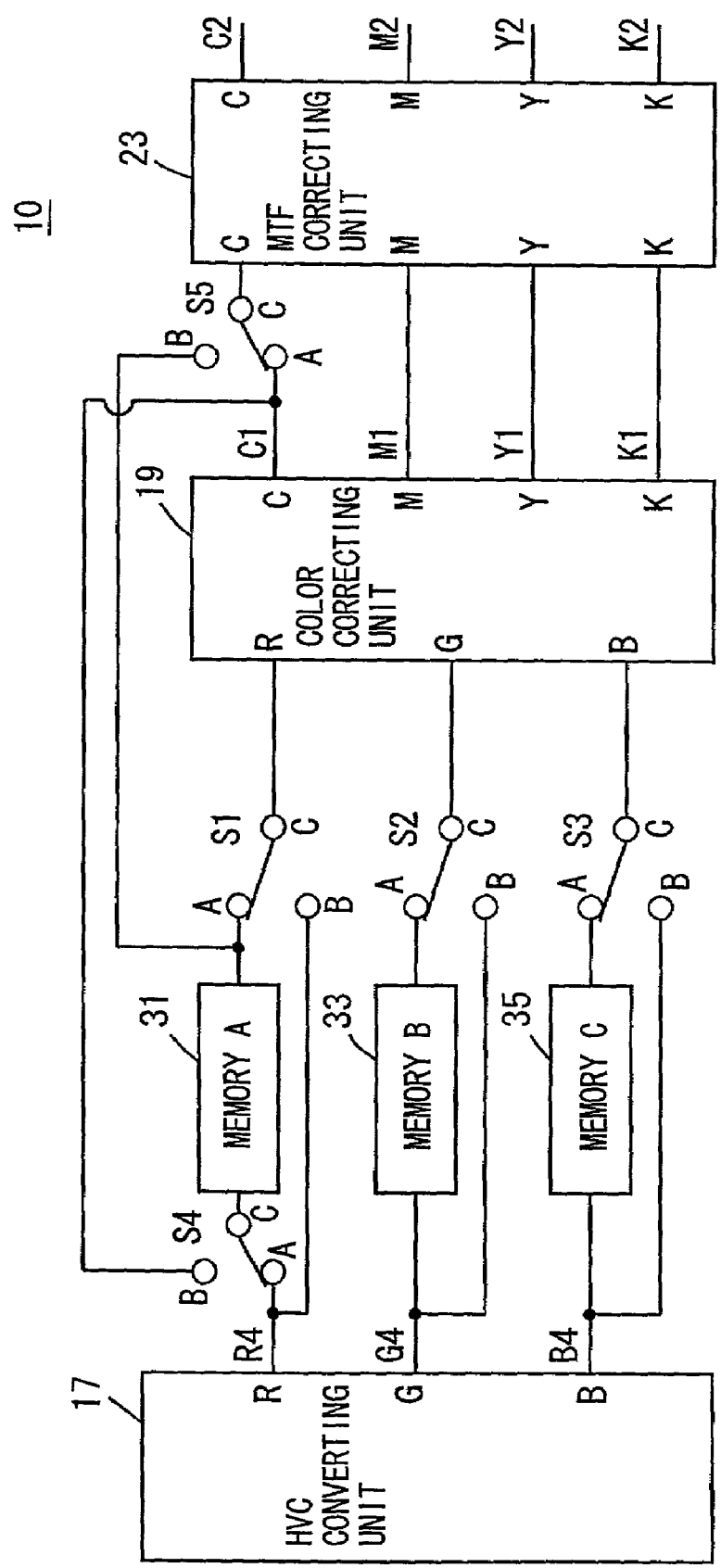
FIG. 4 is a circuit diagram showing a part of a circuit of the image processing apparatus applied to the tandem type color copying machine.

FIG. 4 is a circuit diagram showing a part of a circuit of image processing apparatus 10 applied to tandem type color copying machine 100. Referring to FIG. 4, switches S1 to S5 are switched to have connections between C terminals and A terminals. Then, a memory A 31 is mounted on socket A 25, a memory B 33 is mounted on socket B 27, and a memory C 35 is mounted on socket C 29.

Thus, R output of HVC converting unit 17 is connected to an input terminal of memory A 31, and an output terminal of memory A 31 is connected to R input terminal of color correcting unit 19. The G output terminal of HVC converting unit 17 is connected to an input terminal of memory B 33, and an output terminal of memory B 33 is connected to G input terminal of color correcting unit 19. The B output terminal of HVC converting unit 17 is connected to an input terminal of memory C 35, and an output terminal of memory C 35 is connected to the B input terminal of color correcting unit 19.

Moreover, C output terminal of color correcting unit 19 is connected to C input terminal of MTF correcting unit 23. Further, M output terminal, Y output terminal and K output terminal of color correcting unit 19 are respectively connected to M input terminal, Y input terminal and K input terminal of MTF correcting unit 23.

Thus, by switching switches S1 to S5 such that C terminals are connected to A terminals, memory A 31, memory B 33 and memory C 35 can be connected between HVC converting unit 17 and color correcting unit 19. These memories 31, 33 and 35 are respectively provided for the color data of RGB, so that the timing at which RGB color data R4, G4 and B4 are input to color correcting unit 19 can be delayed by memory A 31, memory B 33 and memory C 35. Furthermore, CMYK image color data C1, M1, Y1 and K1 output from color correcting unit 19 are directly input to MTF correcting unit 23.

Three color data are input to color correcting unit 19 and four image color data are output therefrom, so that the number of memories can be smaller when the memories are installed at a preceding stage of color correcting unit 19 rather than at a subsequent stage thereof.

Figure 5:
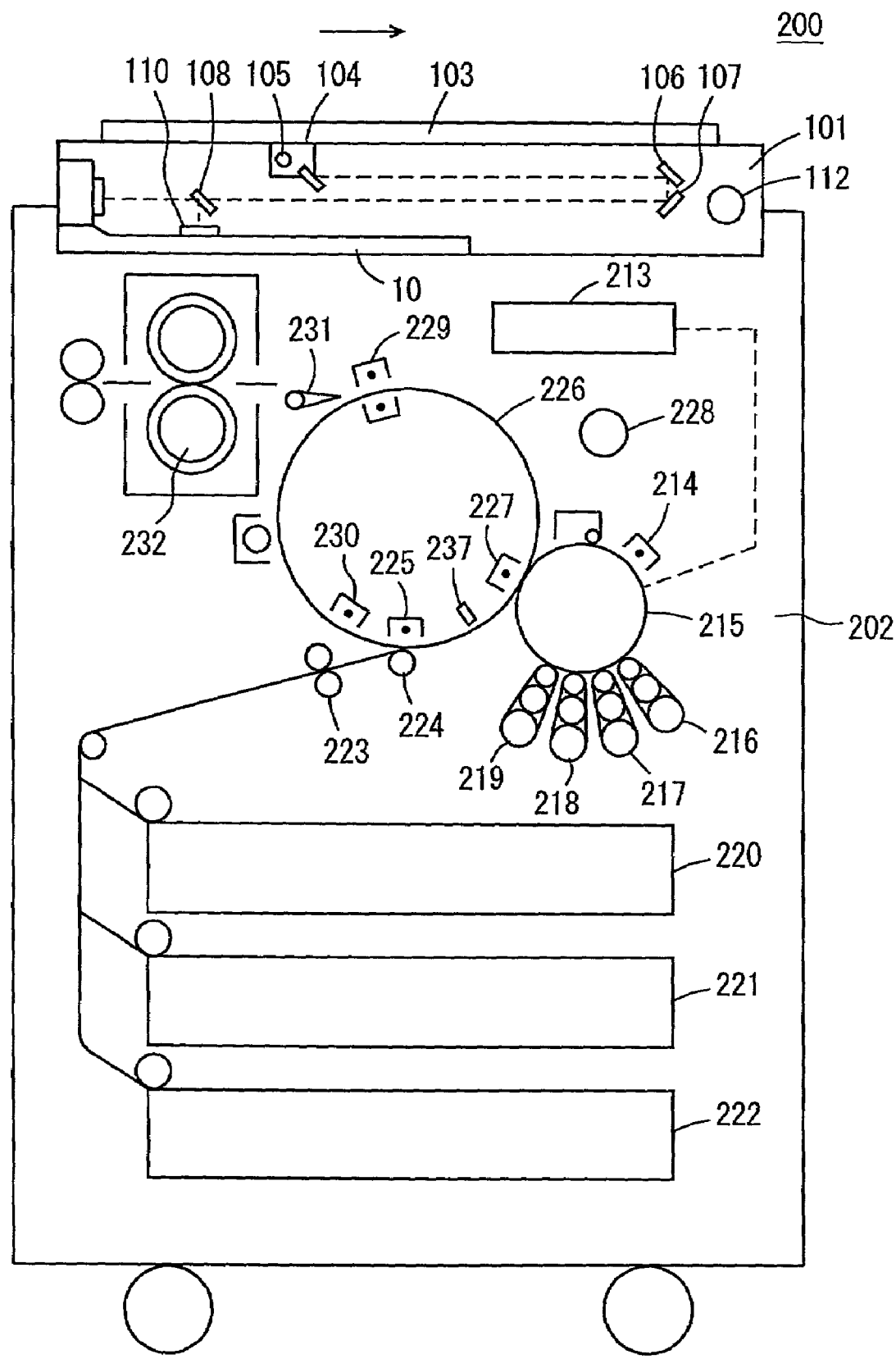
FIG. 5 is a diagrammatic section view showing a schematic configuration of a four-cycle type color copying machine to which the image processing apparatus according to the embodiment is applied.

FIG. 5 is a diagrammatic section view showing a schematic configuration of the four-cycle type color copying machine to which image processing apparatus 10 according to the present embodiment is applied. Referring to FIG. 5, a color copying machine 200 is constituted by an image reader unit 101 reading image data from an original, and a printer unit 202 printing an image onto a sheet of paper. Image reader unit 101 has the same configuration as image reader unit 101 in tandem type color copying machine 100, so that the description thereof will not be repeated here.

When the first reading of the original is performed at image reader unit 101, image processing apparatus 10 outputs image color data for cyan C2 to laser apparatus 213. Thereafter, when the second reading of the original is performed at image reader unit 101, image color data for magenta M2 is output to laser apparatus 213. Then, when the third reading of the original is performed at image reader unit 101, image color data for yellow Y2 is output to laser apparatus 213. Finally, when the fourth reading of the original is performed at image reader unit 101, image color data for black K2 is output to laser apparatus 213.

In printer unit 202, the laser beam output from laser apparatus 213 exposes a photoreceptor drum 215 charged by an electrostatic charger 214 to form an electrostatic latent image. A developing unit corresponding to the image color data received at laser apparatus 213 from image processing apparatus 10 develops the electrostatic latent image on photoreceptor drum 215. When the image color data for cyan is received at laser apparatus 213, a developing unit for cyan 216 develops an electrostatic latent image on photoreceptor drum 215. Similarly, the electrostatic latent images on photoreceptor drum 215 are respectively developed, using a developing unit for magenta 217 in response to image color data for magenta M2, a developing unit for yellow 218 in response to image color data for yellow Y2, and a developing unit for black 219 in response to image color data for black K2.

A suitable sheet is transported by one of paper feed cassettes 220 to 222, and the transported sheet passes through a timing roller 223. A static absorption charger 225 provided opposite to an absorption roller 224 absorbs the sheet to a transfer drum 226.

A toner image developed on photoreceptor 215 is transferred by transfer charger 227 to the sheet wrapped around transfer drum 226. The rotation of transfer drum 226 is controlled by a drum motor 228. At the time of execution of color copying, the printing procedure described above is repeated for four colors of cyan, magenta, yellow and black. That is, transfer drum 226 is rotated four times.

Subsequently, the sheet is separated from transfer drum 226 by the action of a separation charger 229 and a separation claw 231, and is transported to a fixing roller pair 232. At fixing roller pair 232, the sheet is heated and the toner is melted to be fixed onto the sheet. Thereafter, the sheet is discharged from printer unit 202.

Figure 6:
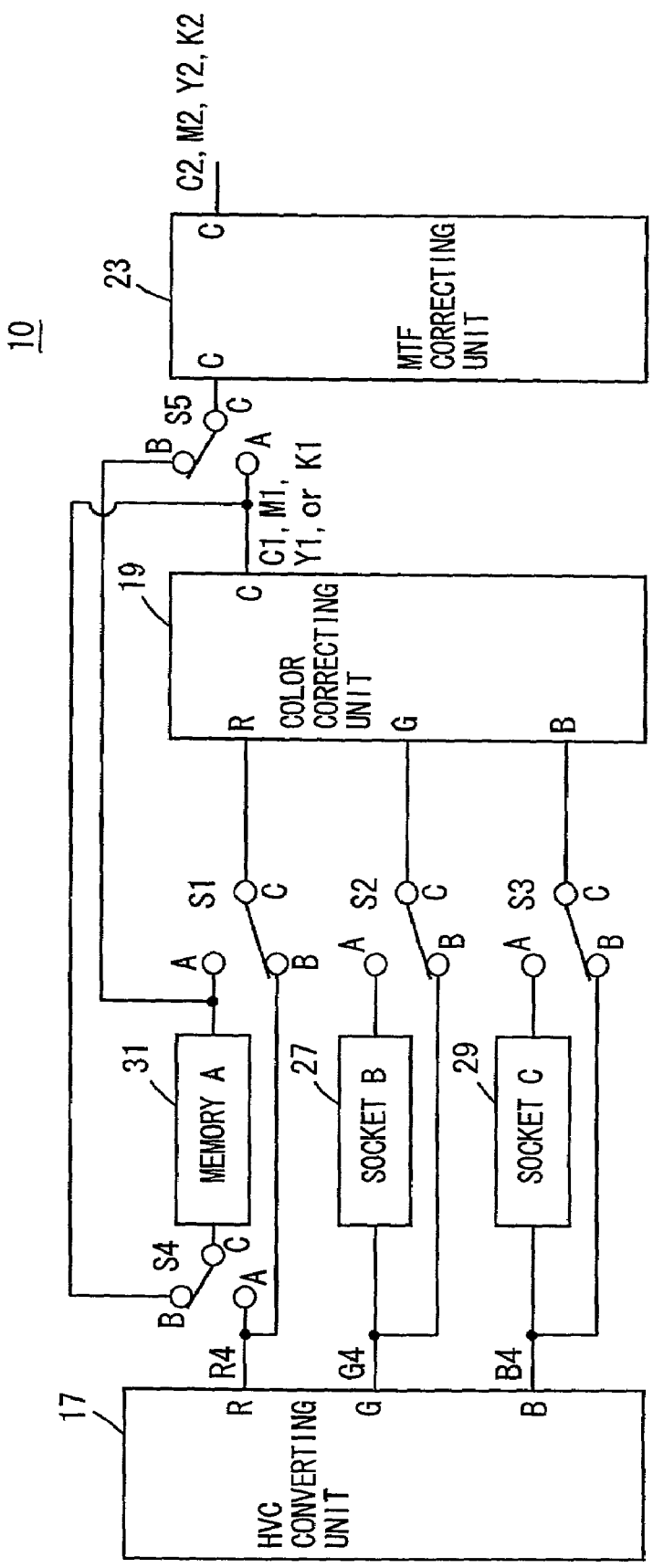
FIG. 6 is a circuit diagram showing a part of a circuit of the image processing apparatus applied to the four-cycle type color copying machine.

FIG. 6 is a circuit diagram showing a part of a circuit of image processing apparatus 10 applied to four-cycle type color copying machine 200. Referring to FIG. 6, switches S1 to S5 are switched to have connections between C terminals and B terminals. Then, memory A 31 is mounted to socket A 25, whereas no memory is mounted to socket B 27 and socket C 29.

By thus switching the switches S1 to S5 such that C terminals are connected to B terminals, R output terminal, G output terminal and B output terminal of HVC converting unit 17 are directly connected to the respective R input terminal, G input terminal and B input terminal of color correcting unit 19.

Furthermore, C output terminal of color correcting unit 19 is connected to the input terminal of memory A 31, and the output terminal of memory A 31 is connected to C input terminal of MTF correcting unit 23.

When image processing apparatus 10 according to the present embodiment is applied to four-cycle type color copying machine 200, color correcting unit 19 outputs image color data in four separate times. Therefore, color correcting unit 19 outputs image color data for cyan C1 from C output terminal when the first reading of the original is performed by image reader 101, outputs image color data for magenta M1 from C output terminal when the second reading is performed, outputs image color data for yellow Y1 from C output terminal when the third reading is performed, and outputs image color data for black K1 from C output terminal when the fourth reading is performed.

Switches S1 to S5 may be switched to have connections between C terminals and B terminals, such that image color data C1, M1, Y1 and K1 output from color correcting unit 19 are input into memory A 31. This can delay the timing at which the image color data C1, M1, Y1 and K1 are input to MTF correcting unit 23.

FIG. 7 shows differences in switches and memories between cases where the image processing apparatus according to the present embodiment is applied to the tandem type color copying machine and where it is applied to the four-cycle type color copying machine. Referring to FIG. 7, when image processing apparatus 10 is applied to the tandem type color copying machine, switches S1 to S5 are switched to have connections between C terminals and A terminals, and thus memory A 31, memory B 33 and memory C 35 are mounted.

On the other hand, when image processing apparatus 10 is applied to the four-cycle type color copying machine, switches S1 to S5 are switched to have connections between C terminals and B terminals, and a memory A is used. Then, memories B and C are not used.

As such, image processing apparatus 10 according to the present embodiment can switch switches S1 to S5 to select a circuit used for the tandem type color copying machine or a circuit used for the four-cycle type color copying machine. Therefore, image processing apparatus 10 applied to the tandem type color copying machine and image processing apparatus 10 applied to the four-cycle type color copying machine can be manufactured on the same substrate, thereby reducing the manufacturing cost of the substrate for image processing apparatus 10.

Moreover, different circuit configurations can be made only by switching switches S1 to S5, so that the number of man-hours needed for circuit design can be reduced. This results in reduction of designing cost of the image processing circuit.

Further, when image processing apparatus 10 is applied to the tandem type color copying machine, memory A 33, memory B 35 and memory C 37 are mounted, whereas when it is applied to the four-cycle type color copying machine, only memory A 27 is mounted and there is no need to mount memory B 33 and memory C 35. Thus, even if image processing apparatus 10 is designed in common for the tandem type and the four-cycle type, when image processing apparatus 10 is applied to the four-cycle type color copying machine, there will be no need to mount memory B 33 and memory C 36 that are required for the tandem type. Therefore, the cost for image processing apparatus 10 used for the four-cycle type can be reduced. As a result, optimal mounting of memory can be achieved with a simple configuration.

It is noted that, though an example where image processing apparatus 10 is applied to a color copying machine was described in the present embodiment, the application is not limited to the color copying machine, but a personal computer or a printer controller controlling a printer may also be used. Further, it is understood that, though the description of image processing apparatus 10 was made using RGB color data and CMYK image color data, the application is not limited to these, but can be made to data processing of other color systems.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus, comprising:
   a first processing means for sequentially processing pixel data in response to input of the pixel data;
   a second processing means for determining a characteristic of an image region including a plurality of said pixel data;
   a third processing means for processing pixel data processed at said first processing means, based on the characteristic determined by said second processing means;
   a connecting means for connecting a memory device; and
   a switch device for switching a circuit such that said connecting means is arranged either at a preceding stage of said first processing means or between said first processing means and said third processing means.

2. An image processing apparatus, comprising:
   a first processing means for converting, in response to input of pixel data including a set of a plurality of color data, said plurality of color data into a plurality of image color data in a first state, and said plurality of color data into one image color data of said plurality of image color data in a second state;
   a second processing means for determining a characteristic of an image region including a plurality of said pixel data;
   a third processing means for processing, based on a characteristic amount determined by said second processing means, said plurality of image color data converted at said first processing means in said first state, and the one image color data converted at said first processing means in said second state;
   a connecting means for connecting a memory device; and
   a switch device for arranging a plurality of said connecting means, corresponding to said plurality of color data, at a preceding stage of said first processing means in said first state, and for arranging said connecting means, corresponding to said one image color data, between said first processing means and said third processing means in said second state.

3. An image processing apparatus, comprising:
   a memory device to store input image data;
   a first processing unit to sequentially convert and output the image data stored in said memory device;
   a second processing unit to receive the same image data as image data input into said memory device and to output data processed based on the received image data; and
   a third processing unit to receive the image data output from said first processing unit and the data output from said second processing unit, and to process the image data output from said first processing unit based on the data output from said second processing unit, wherein same image data is input into said memory device and said second processing unit in parallel.

4. The image processing apparatus according to claim 3, wherein said second processing unit determines an attribute of an image region based on image data of a pixel to be processed and pixels on the periphery of said pixel to be processed, and outputs data indicating the attribute.

5. The image processing apparatus according to claim 3, wherein said first processing unit converts the input image data into image data of a different color system to output the converted image data.

6. The image processing apparatus according to claim 3, wherein said third processing unit processes the image data output from said first processing unit to correct sharpness of an image.

7. The image processing apparatus according to claim 3, wherein said third processing unit substantially simultaneously receives the image data from said first processing unit and data corresponding to said image data from said second processing unit.

8. An image processing apparatus, comprising:
   a memory device to store input image data;
   a first processing unit to sequentially convert and output the image data stored in said memory device;
   a second processing unit to receive the same image data as image data input into said memory device and to output data processed based on the received image data; and
   a third processing unit to receive the image data output from said first processing unit and the data output from said second processing unit, and to process the image data output from said first processing unit based on the data output from said second processing unit, wherein said second processing unit determines an attribute of an image region based on image data of a pixel to be processed and pixels on the periphery of said pixel to be processed, and outputs data indicating the attribute, and
   said second processing unit determines if the image region is represented by a character.

9. An image processing apparatus, comprising:
   a memory device to store input image data;
   a first processing unit to sequentially convert and output the image data stored in said memory device;
   a second processing unit to receive the same image data as image data input into said memory device and to output data processed based on the received image data; and
   a third processing unit to receive the image data output from said first processing unit and the data output from said second processing unit, and to process the image data output from said first processing unit based on the data output from said second processing unit, wherein said second processing unit determines an attribute of an image region based on image data of a pixel to be processed and pixels on the periphery of said pixel to be processed, and outputs data indicating the attribute, and said second processing unit determines if the image region is represented by a photograph.

10. An image processing apparatus, comprising:

a memory device to store input image data;

a first processing unit to sequentially convert and output the image data stored in said memory device;

a second processing unit to receive the same image data as image data input into said memory device and to output data processed based on the received image data; and a third processing unit to receive the image data output from said first processing unit and the data output from said second processing unit, and to process the image data output from said first processing unit based on the data output from said second processing unit, wherein said second processing unit determines an attribute of an image region based on image data of a pixel to be processed and pixels on the periphery of said pixel to be processed, and outputs data indicating the attribute, and said second processing unit determines if the image region is represented by a dot.

11. An image processing apparatus, comprising:

a memory device to store image data;

a first processing unit to sequentially convert and output input image data;

a second processing unit to receive a plurality of said image data, and to output data processed based on the input image data;

a third processing unit to process image data output from said memory device and image data processed at said first processing unit, based on the data output from said second processing unit;

a first circuit to input the image data output from said memory device into said first processing unit;

a second circuit to input the image data output from said first processing unit into said memory device and also to input the image data output from said memory device into said second processing unit; and a switch device to selectively switch said first circuit and said second circuit.

12. The image processing apparatus according to claim 11, wherein same image data is input into said memory device and said second processing unit in parallel, when said first circuit is selected by said switching device.

13. The image processing apparatus according to claim 11, wherein same image data is input into said first processing unit and said second processing unit in parallel, when said second circuit is selected by said switching device.

14. The image processing apparatus according to claim 11, wherein said second processing unit determines an attribute of an image region based on image data of a pixel to be processed and pixels on the periphery of said pixel to be processed, and outputs data indicating the attribute.

15. The image processing apparatus according to claim 11, wherein said first processing unit converts the input image data into image data of a different color system to output the converted image data.

16. The image processing apparatus according to claim 11, wherein said third processing unit processes the image data output from said first processing unit to correct sharpness of an image.

17. The image processing apparatus according to claim 11, wherein said third processing unit substantially simultaneously receives the image data from said first processing unit and data corresponding to said image data from said second processing unit.

18. An image processing apparatus, comprising:

a memory device to store image data;

a first processing unit to convert, in response to input of image data including a set of a plurality of color data, said plurality of color data into a plurality of image color data in a first state, and said plurality of color data into one image color data of said plurality of image color data in a second state;

a second processing unit to receive a plurality of said image data, and to output data processed based on the input image data;

a third processing unit to process, based on data output from said second processing unit, a plurality of image color data converted at said first processing unit in said first state, and the one image color data converted at said first processing unit in said second state;

a first circuit to input image data including a set of a plurality of color data output from said memory device into said first processing unit;

a second circuit to input one image color data output from said first processing unit into said memory device, and also inputting one image color data output from said memory device into said second processing unit; and a switch device to selectively switch said first circuit and said second circuit to select said first circuit in said first state and to select said second circuit in said second state.

19. The image processing apparatus according to claim 18, wherein same image data is input into said memory device and said second processing unit in parallel, when said first circuit is selected by said switching device.

20. The image processing apparatus according to claim 18, wherein same image data is input into said first processing unit and said second processing unit in parallel, when said second circuit is selected by said switch device.

21. The image processing apparatus according to claim 18, wherein said second processing unit determines an attribute of an image region based on image data of a pixel to be processed and pixels on the periphery of said pixel to be processed, and outputs data indicating the attribute.

22. The image processing apparatus according to claim 18, wherein said first processing unit converts the input image data into image data of a different color system to output the converted image data.

23. The image processing apparatus according to claim 18, wherein said third processing unit processes the image data output from said first processing unit to correct sharpness of an image.

24. The image processing apparatus according to claim 18, wherein said third processing unit substantially simultaneously receives the image data from said first processing unit and data corresponding to said image data from said second processing unit.

25. An image forming apparatus, comprising:
a memory device to store input image data;
a first processing unit to sequentially convert and output the image data stored in said memory device;
a second processing unit to receive same image data as the image data input to said memory device, and to output data processed based on the input image data;
a third processing unit to receive the image data output from said first processing unit and the data output from said second processing unit, and to process the image data output from said first processing unit based on the data output from said second processing unit; and
an image forming unit to form an image on a sheet based on image data output from said third processing unit, wherein same image data is input into said memory device and said second processing unit in parallel.

26. An image forming apparatus, comprising:
a memory device to store image data;
a first processing unit to sequentially convert and output input image data;
a second processing unit to receive a plurality of said image data, and to output data processed based on the input image data;
a third processing unit to process image data output from said memory device and image data processed at said first processing unit, based on the data output from said second processing unit;
a first circuit to input image data output from said memory device into said first processing unit;
a second circuit to input the image data output from said first processing unit and also to input the image data output from said memory device into said second processing unit;
a switch device to selectively switch said first circuit and said second circuit; and
an image forming unit to form an image on a sheet based on the image data output from said third processing unit.

\* \* \* \* \*